(12) United States Patent
Iwaki et al.

(10) Patent No.: US 6,384,503 B1
(45) Date of Patent: May 7, 2002

(54) MOTOR

(75) Inventors: Tadao Iwaki; Naoki Kawawada; Atsushi Ohta; Koji Nitadori, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/552,440

(22) Filed: Apr. 18, 2000

(30) Foreign Application Priority Data

Apr. 26, 1999 (JP) .............................................. 11-118615

(51) Int. Cl.[7] .............................................. H02K 15/02
(52) U.S. Cl. .............................. 310/156.47; 310/156.21
(58) Field of Search ................................. 310/156, 261, 310/42, 67 R; 29/596–598; 360/99.07, 99.08, 99.04, 98.07

(56) References Cited

U.S. PATENT DOCUMENTS

| | | | | |
|---|---|---|---|---|
| 1,861,059 A | * | 5/1932 | Johson | 310/211 |
| 4,443,776 A | * | 4/1984 | Cunningham | 310/268 |
| 4,642,502 A | * | 2/1987 | Carpenter et al. | 310/156 |
| 5,034,642 A | * | 7/1991 | Hoemann et al. | 310/156 |
| 5,157,295 A | * | 10/1992 | Stefansky et al. | 310/67 R |
| 5,760,520 A | * | 6/1998 | Hasebe et al. | 310/261 |
| 5,774,302 A | * | 6/1998 | Elsaesser et al. | 360/98.07 |
| 6,081,058 A | * | 6/2000 | Suzuki et al. | 310/156 |
| 6,097,121 A | * | 8/2000 | Oku | 310/67 R |

* cited by examiner

*Primary Examiner*—Tran Nguyen
(74) *Attorney, Agent, or Firm*—Adams & Wilks

(57) ABSTRACT

A motor has an armature disposed on one of a rotor and a stator and a permanent magnet disposed on the other of the rotor and the stator. The permanent magnet has skewed magnetic poles being magnetized so that a boundary between each pair of skewed magnetic poles is generally S-shaped and opposed areas of pole surfaces of the permanent magnet and the armature gradually increase when the pole surface of the permanent magnet enters a magnetic field region of the pole surface of the armature or gradually decrease when the pole surface of the permanent magnet leaves a magnetic field region of the pole surface of the armature.

16 Claims, 4 Drawing Sheets

MOTOR

BACKGROUND OF THE INVENTION

The present invention relates to a motor using a permanent magnet as in a spindle motor.

Spindle motors include a permanent magnet and an armature each having a plurality of pole surfaces such that the pole surfaces are provided in a relationship of being in a direction of rotor rotation. In the motor of this kind, the permanent magnet is formed by magnetizing a cylindrical or ring formed permanent magnet material in a rotor radial direction such that N-poles and S-poles exist alternately with respect to a rotation direction.

In a motor desired for size reduction, particularly in thickness dimension (dimension in rotation axis direction) as in a spindle motor for a hard disk drive (HDD), a cylindrical or ring formed permanent magnet is arranged as one member on the rotor, with an armature as one member arranged on an inner side of the permanent magnet on the stator.

The motor of this kind switches electrically or mechanically the direction of a current flowing to the armature to periodically switch the direction of a magnetic field to be caused by the armature, thereby acting separately Lorentz's forces upon the permanent magnet or armature and obtaining a rotation force.

However, in the motor of this kind, the pole surface edges (or magnetic pole boundary) of the permanent magnet and armature in a rotor rotation direction extend in a straight line form and parallel with a rotation axis. This however provides a structure that the magnetic field formed by the pole surface of the permanent magnet and the pole surface of the armature rapidly changes in their space distributions. As a result, a so-called cogging phenomenon occurs so that the rotor will not rotate smoothly.

SUMMARY OF THE INVENTION

Therefore, it is an object of the present invention to suppress the cogging phenomenon from occurring in a motor, such as a spindle motor.

A motor according to the invention includes a permanent magnet arranged on one of a rotor and a stator, and an armature arranged on the other of the rotor and the stator. The permanent magnet is magnetized such that opposed areas of pole surfaces of the permanent magnet and the armature gradually increase when the pole surface of the permanent magnet enters a magnetic field region of the pole surface of the armature or gradually decrease when the pole surface of the permanent magnet leaves a magnetic field region of the pole surface of the armature.

As a result of various studies by the present inventors, it was revealed that cogging phenomenon occurs due to rapid change of a magnetic field distribution formed by the permanent magnet and armature when the permanent magnet at its pole surface enters and leaves a magnetic field region of the pole surface of the armature.

Accordingly, when the permanent magnet at its pole surface enters a magnetic field region of the pole surface of the armature, if the pole surface opposed areas of the permanent magnet and armature gradually increase, the change rate of a magnetic field distribution formed by the permanent magnet and armature decreases, resulting in less possibility of causing cogging phenomenon. Also, when the permanent magnet at its pole surface leaves a magnetic field region of the pole surface of the armature, if the pole surface opposed areas of the permanent magnet and armature gradually decrease, the change rate of a magnetic field distribution formed by the permanent magnet and armature decreases, resulting in less possibility of causing cogging phenomenon. Therefore, the present invention suppresses cogging phenomenon from occurring.

The permanent magnet may have a cylindrical form having the pole surface in an inner peripheral surface thereof, and the armature can be arranged on an inner side of the permanent magnet. This can reduce the size, particularly thickness dimension (dimension in the rotation axis direction), of the motor, as in the spindle motor for HDD.

The permanent magnet may be magnetized such that the opposed areas of pole surfaces of the permanent magnet and the armature gradually increase and gradually decrease when the pole surface of the permanent magnet enters a magnetic field region of the pole surface of the armature and leaves a magnetic field region of the pole surface of the armature, respectively.

However, the permanent magnet may be magnetized such that the opposed areas of pole surfaces of the permanent magnet and the armature gradually decrease when the pole surface of the permanent magnet leaves a magnetic field region of the pole surface of the armature. Also, the permanent magnet may be magnetized such that the change rate of the opposed areas of pole surfaces of the permanent magnet and the armature gradually increase when the pole surface of the permanent magnet enters a magnetic field region of the pole surface of the armature.

DETAILED DESCRIPTION OF THE PREFERRED EMBODIMENTS

Figure 1:
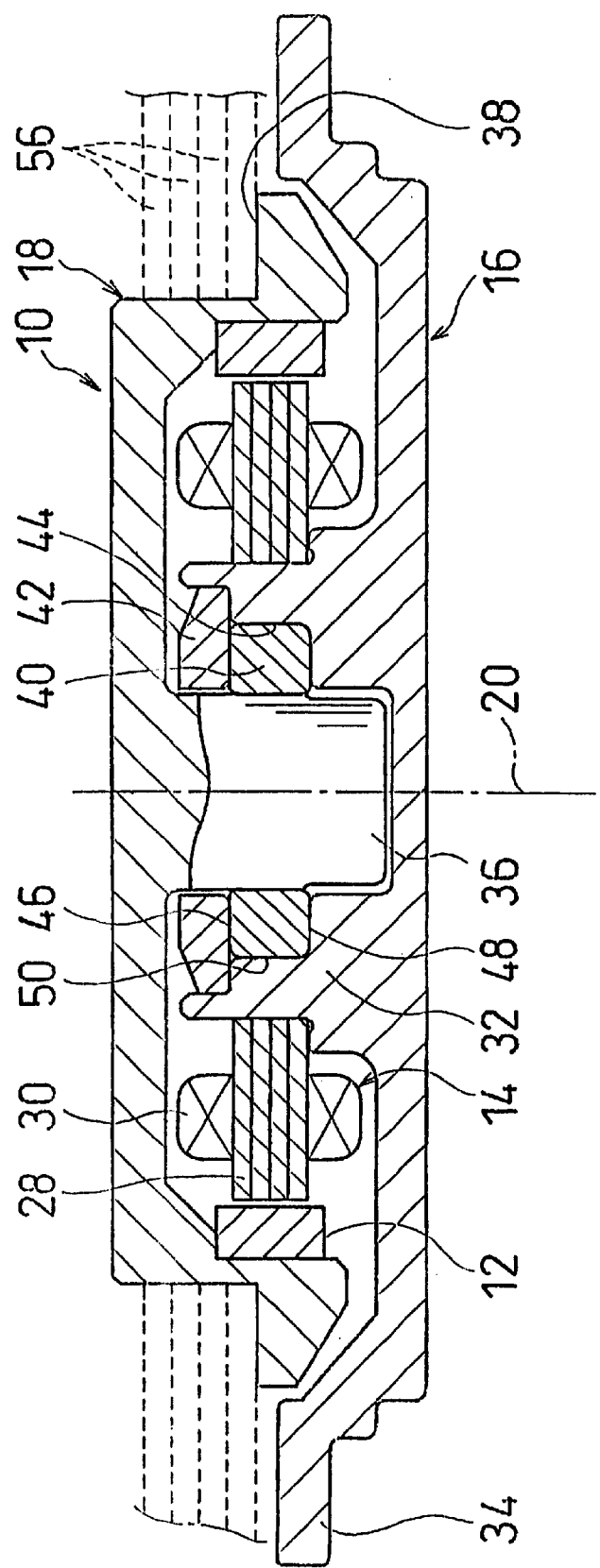
FIG. 1 is a sectional view showing one embodiment of a motor according to the present invention.

Referring to FIG. 1, a motor 10 is a spindle motor using a permanent magnet 12 in a short cylindrical or ring form, and an armature 14 arranged inwardly of the permanent magnet 12. The armature 14 is arranged on a stator 16. The permanent magnet 12 is arranged on a rotor 18 for undergoing rotation around a rotation axis 20. permanent magnet 12 is arranged on a rotor 18 to rotate around a rotation axis 20.

Figure 2:
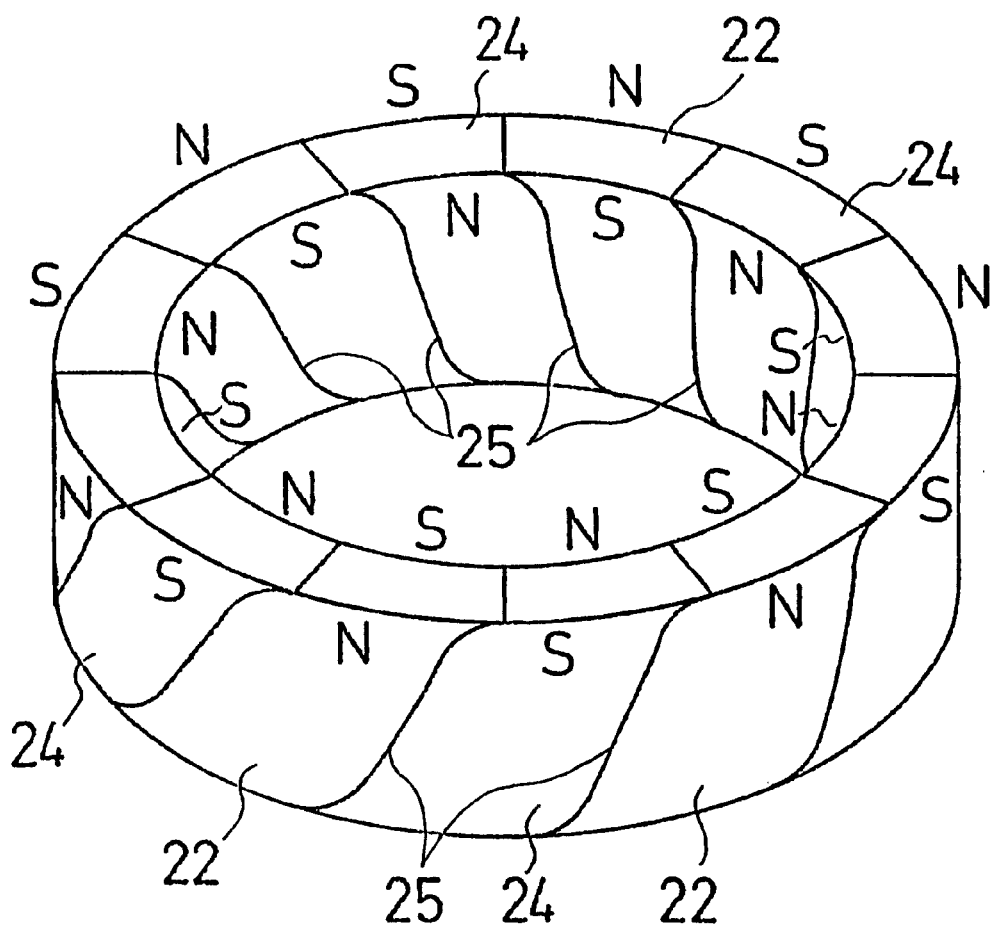
FIG. 2 is a perspective view showing one embodiment of a permanent magnet used in the motor shown in FIG. 1.
Figure 3:
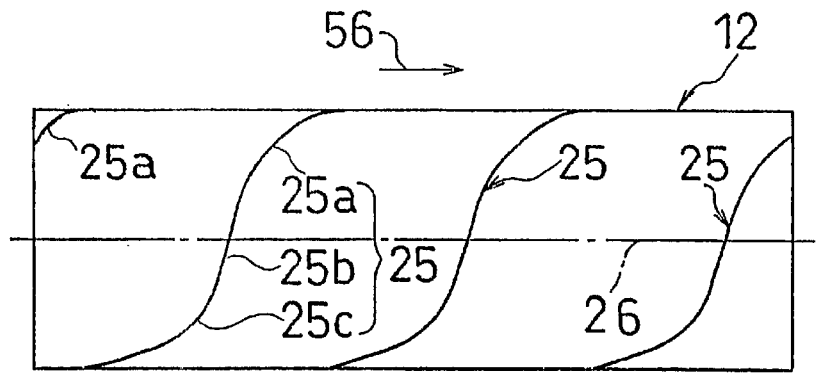
FIG. 3 is a diagram showing a first embodiment of a magnetizing state of the permanent magnet.

As shown in FIG. 2 and FIG. 3, the permanent magnet 12 has, around the rotation axis 20, a plurality of magnetic poles 22, 24 magnetized in a rotational radial direction of the rotor 18. The adjacent magnetic poles 22, 24 in a rotation direction of the rotor 18 are magnetized in opposite directions. Each magnetic pole 22, 24 has an inner surface serving as a pole surface of the permanent magnet 12.

The magnetization on the permanent magnet 12 is by skew magnetization that is twisted with respect to the rotation axis 20. More specifically, the magnetization is by oblique-S-formed skew magnetization so that the boundary 25 between the adjacent magnetic poles 22, 24 of the rotor 18 with respect to a rotation direction is inverted nearly about a magnetic center 26 of a pole surface with respect to a direction of the rotation axis 20 and extends in an oblique S-form.

In the illustrated embodiment, the nonlinear boundary 25 between the adjacent magnetic poles 22, 24 has a curve line portion 25a, a curve line portion 25b continuing the curve line portion 25a, and a curve line portion 25c continuing the curve line portion 25b. The curve line portion 25b has a radius of curvature gradually increasing from the curve line portion 25a and gradually decreasing toward the curve line portion 25c. The curve line portion 25c is in symmetry with the curve line portion 25a. The curve line portion 25b inverts in radius of curvature at a magnetic center 26.

The armature 14 has a core 28 laminated with a plurality of core members formed of thin metal plates, such as silicon steel plates, and an excitation coil 30 wound around the magnetic poles of the core 28. The magnetic poles of the core 28 have an outer peripheral surface serving as a pole surface for the armature 14. The pole surface of the armature 14 has, in a developed state, nearly a rectangular form.

The stator 16 is in a dish form and serves as a mount base. The stator 16 has a boss portion 32 in a center and a flange portion 34 in an outer periphery, and is screwed at the flange portion 34 to a proper member, such as a housing. The boss portion 32 has a space opened to the above. The armature 14 is assembled so as not to rotate relative to an outer periphery of the boss portion 32.

The rotor 18 is also in a dish form. The rotor 18 has at a center a shaft 36 received in the boss portion 32 and at an outer periphery thereof an upward step portion 38. The permanent magnet 12 is mounted so as to not rotate relative to an inner side of the outer periphery.

The shaft 36 is mounted with a ring 40 so as to not undergo relative rotation. The ring 40 has nearly a rectangular sectional form, and is received in an annular recess 44 formed in the boss portion 32, and a ring-formed auxiliary member 42 is arranged on the boss portion 32. The auxiliary member 42 is assembled so as to not rotate relative the boss portion 32.

Thrust dynamic pressure bearing regions 46, 48 are provided between opposite inner surfaces (top and bottom surfaces) of the recess 44 and the corresponding opposite surfaces (top and bottom surfaces) of the ring 40, with respect to a direction of the rotation axis 20. A radial dynamic pressure bearing region 50 is provided between a deep bottom surface (inner peripheral surface) of the recess 44 and an outer peripheral surface of the ring 40. These dynamic pressure bearing regions 46, 48, 50 are filled with a liquid, such as a lubrication oil.

Figure 4:
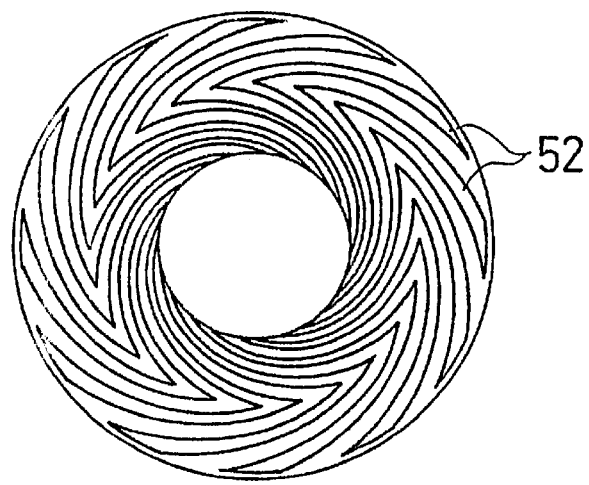
FIG. 4 is a view showing one embodiment of thrust dynamic pressure grooves.
Figure 5:
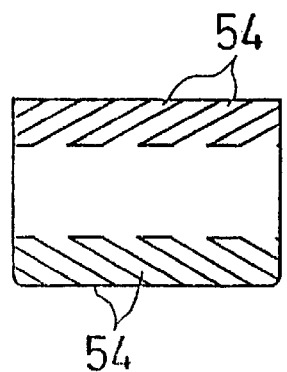
FIG. 5 is a view showing one embodiment of radial dynamic pressure grooves.

Thrust dynamic pressure grooves 52 as shown in FIG. 4 are formed in the opposite inner surfaces of the recess 44 or the corresponding opposite surfaces of the ring 40, with respect to the direction of the rotation axis 20. Also, radial dynamic pressure grooves 54 as shown in FIG. 5 are formed in a deep bottom surface of the recess 44 or an outer peripheral surface of the ring 40.

In use, a plurality of hard disks 56 are placed and stacked on the upward step 38 of the rotor 18. When a predetermined frequency of a drive current is supplied with a predetermined phase to the excitation coil 30 of the armature 14, the rotor 18 is rotated due to an interaction between a rotary magnetic field formed by the armature 14 and a magnetic field from the permanent magnet 12.

Assumption is made such that the rotational direction of the rotor 18 is in a direction of the arrow 56 in FIG. 3. In the motor 10, when the permanent magnet 12 in its pole surface enters a magnetic field region of a pole surface of the armature 14, the opposed pole surface areas between the permanent magnet 12 and the armature 14 gradually increase. This reduces the change rate of a magnetic field distribution formed by the permanent magnet 12 and armature 14. Thus, there is less possibility of causing cogging phenomenon.

Similarly, when the pole surface of the permanent magnet 12 leaves a magnetic field region of the pole surface of the armature 14, the opposed pole surface areas of the permanent magnet 12 and armature 14 gradually decreases. This reduces the change rate of a magnetic field distribution formed by the permanent magnet and armature. Thus, there is less possibility of causing cogging phenomenon.

According to the motor 10, vibration noise can be suppressed from occurring in the rotation axis direction by merely changing the magnetization pattern on the permanent magnet without changing the shape of a part or using a new part. It is accordingly possible to provide an inexpensive motor, particularly a spindle motor, wherein cogging phenomenon occurs with less frequency.

Incidentally, magnetization for the permanent magnet 12 way have another pole surface from in place of magnetization having a boundary 25 formed by three curve line portions 25a, 25b, 25c in each pole surface as long as the opposed pole surf ace areas of the permanent magnet 12 and armature 14 gradually increase when the pole surface of the permanent magnet 12 enters a magnetic field region of the pole surface of the armature 14 and gradually decrease when the pole surf ace of the permanent magnet 12 leaves a magnetic field region of the pole surface of the armature 14.

Figure 6:
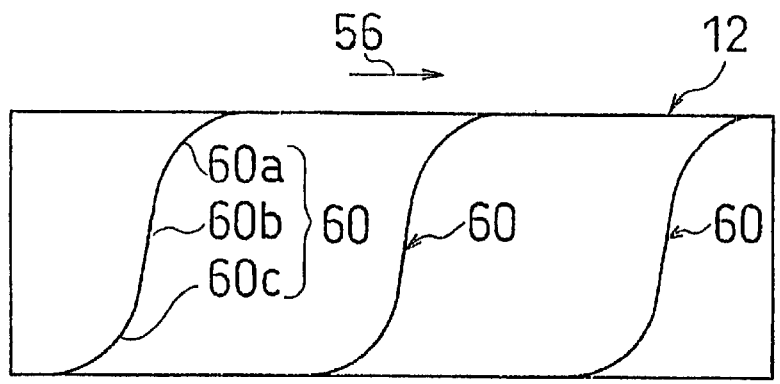
FIG. 6 is a diagram showing a second embodiment of a magnetizing state of the permanent magnet.

In an embodiment of FIG. 6, a permanent magnet 12 has pole surfaces each having a boundary 60 having a curve line portion 60a, a straight line portion 60b continuing the curve line portion 60a, and a curve line portion 60c continuing the straight line portion 60b and reverse to the curve line portion 60a.

Figure 7:
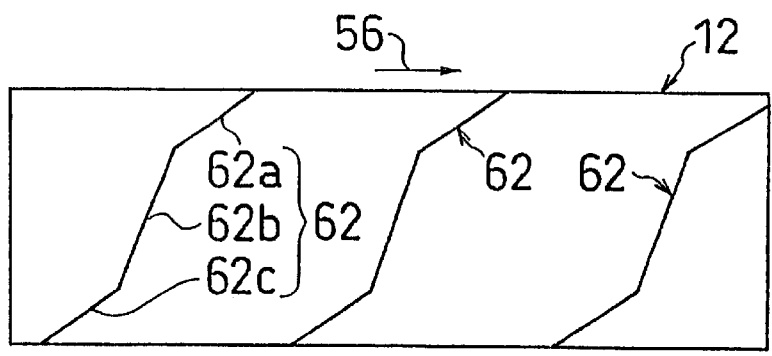
FIG. 7 is a diagram showing a third embodiment of a magnetizing state of the permanent magnet.

In an embodiment of FIG. 7, a permanent magnet 12 has pole surfaces each having a boundary 62 having a straight line portion 62a increased in twist angle with respect to the rotation axis 20, a straight line portion 62b continuing the straight line portion 62a and decreased in twist angle with respect to the rotation axis, and a straight line portion 62c continuing the straight line portion 62b and increased in twist angle with respect to the rotation axis.

In all of the above embodiments, the permanent magnet 12 is provided with magnetization such that the opposed surface areas of the permanent magnet 12 and armature 14 gradually increase and gradually decrease when the pole pole surface of the permanent magnet 12 enters and leaves a magnetic field region of the pole surface of the armature 14, respectively.

However, the magnetization on the permanent magnet 12 may be made such that the opposed pole surface areas of the permanent magnet 12 and armature 14 gradually decrease when the pole surface of the permanent magnet 12 leaves a magnetic field region of the pole surface of the armature 14. Also, the magnetization may be made such that the opposed pole surface areas of the permanent magnet 12 and armature 14 gradually increase when the pole surface of the permanent magnet 12 enters a magnetic field region of the pole surface of the armature 14. With such magnetization on the permanent 12, the opposed pole surface areas of the permanent magnet 12 and armature 14 gradually increase or gradually decrease when the pole surface of the permanent magnet 12 enters a magnetic field region of the pole surface of the armature 14 or leaves a magnetic field region of the pole surface of the armature 14. Accordingly, cogging phenomenon is suppressed from occurring when the pole surface of the permanent magnet 12 enters a magnetic field region of the pole surface of the armature 14 or leaves a magnetic field region of the pole surface of the armature 14.

Figure 8:
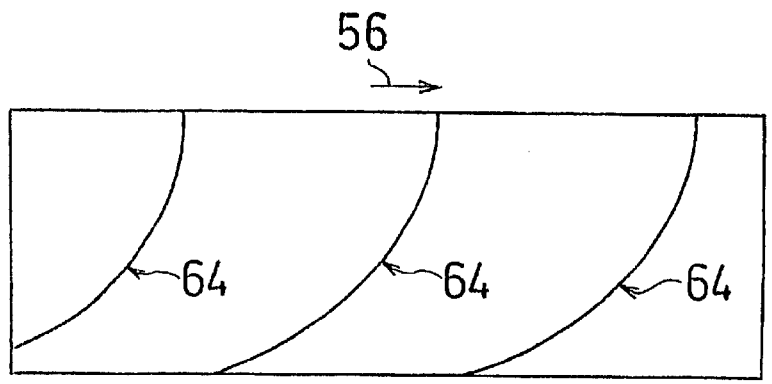
FIG. 8 is a diagram showing a fourth embodiment of a magnetizing state of the permanent magnet.

In an embodiment of FIG. 8, the magnetization on a permanent magnet 12 is made such that the boundary 64 of each pole surface of the permanent magnet 12 gradually increases in twist angle with respect to the rotation axis 20. Due to this, the opposed pole surface areas of the permanent magnet 12 and armature 14 gradually decrease when the pole surface of the permanent magnet 12 leaves a magnetic field region of the pole surface of the armature 14.

In the above embodiments, in place of using a liquid dynamic pressure bearing, other bearings such as a gas dynamic pressure bearing, a ball bearing, and a roll bearing may be used. Also, in place of arranging a permanent magnet, on the rotor and armature on the stator, a permanent magnet may be arranged on the stator and an armature on the rotor.

The present invention is not limited to the above embodiments. For example, various grooves other than those of the above embodiments may be used as a dynamic pressure groove, and the fluid dynamic pressure bearing region be formed in other points than those of the above embodiments. Accordingly, the present invention can be changed in various ways without departing from the gist thereof.

What is claimed is:

1. A motor comprising: an armature disposed on one of a rotor and a stator; and a permanent magnet disposed on the other of the rotor and the stator, the permanent magnet having a plurality of skewed magnetic poles being magnetized so that a boundary between each pair of skewed magnetic poles is generally nonlinear S-shaped and opposed areas of pole surfaces of the permanent magnet and the armature gradually increase when the pole surface of the permanent magnet enters a magnetic field region of the pole surface of the armature or gradually decrease when the pole surface of the permanent magnet leaves a magnetic field region of the pole surface of the of the armature.

2. A motor according to claim 1; wherein the permanent magnet comprises a cylindrical member having an inner peripheral surface forming the pole surface of the permanent magnet; and wherein the armature is disposed on an inner side of the permanent magnet.

3. A motor according to claim 1; wherein each of the boundaries comprises a first curved line portion, a second curved line portion and a third curved line portion, the second curved line portion having a radius of curvature gradually increasing in a direction away from the first curved line portion and gradually decreasing in a direction toward the third curved line portion.

4. A motor according to claim 3; wherein the third curved line portion is symmetrical with the first curved line portion about a magnetic center of the permanent magnet.

5. A motor according to claim 3; wherein the second curved line portion inverts in radius of curvature at a magnetic center of the permanent magnet.

6. A motor according to claim 1; wherein each of the boundaries is inverted nearly about a magnetic center of the permanent magnet with respect to a rotational axis of the permanent magnet.

7. A motor comprising: an armature disposed on one of a rotor and a stator; and a permanent magnet disposed on the other of the rotor and the stator, the permanent magnet having a plurality of skewed magnetic poles being magnetized so that a boundary between each pair of skewed magnetic poles is generally nonlinear S-shaped and opposed areas of pole surfaces of the permanent magnet and the armature gradually increase when the pole surface of the permanent magnet enters a magnetic field region of the pole surface of the armature and gradually decrease when the pole surface of the permanent magnet leaves a magnetic field region of the pole surface of the armature.

8. A motor according to claim 7; wherein each of the boundaries comprises a first curved line portion, a second curved line portion and a third curved line portion, the second curved line portion having a radius of curvature gradually increasing in a direction away from the first curved line portion and gradually decreasing in a direction toward the third curved line portion.

9. A motor according to claim 8; wherein the third curved line portion is symmetrical with the first curved line portion about a magnetic center of the permanent magnet.

10. A motor according to claim 8; wherein the second curved line portion inverts in radius of curvature at a magnetic center of the permanent magnet.

11. A motor according to claim 7; wherein each of the boundaries is inverted nearly about a magnetic center of the permanent magnet with respect to a rotational axis of the permanent magnet.

12. A motor comprising: a stator; a rotor mounted for undergoing rotation relative to the stator about a rotational axis; an armature disposed on one of the rotor and the stator and having a plurality of magnetic poles; and a permanent magnet disposed on the other of the rotor and the stator, the permanent magnet having a plurality of skewed magnetic poles magnetized in a rotational direction of the rotor so that a boundary between each pair of adjacent skewed magnetic poles is generally nonlinear S-shaped.

13. A motor according to claim 12; wherein each of the boundaries comprises a first curved line portion, a second curved line portion and a third curved line portion, the second curved line portion having a radius of curvature gradually increasing in a direction away from the first curved line portion and gradually decreasing in a direction toward the third curved line portion.

14. A motor according to claim 13; wherein the third curved line portion is symmetrical with the first curved line portion about a magnetic center of the permanent magnet.

15. A motor according to claim 13; wherein the second curved line portion inverts in radius of curvature at a magnetic center of the permanent magnet.

16. A motor according to claim 12; wherein each of the boundaries is inverted nearly about a magnetic center of the permanent magnet with respect to the rotational axis thereof.

* * * * *